(12) United States Patent
Larsson et al.

(10) Patent No.: US 12,534,793 B2
(45) Date of Patent: *Jan. 27, 2026

(54) METHOD OF HEAT TREATING A STEEL COMPONENT

(71) Applicant: Aktiebolaget SKF, Gothenburg (SE)

(72) Inventors: Karl Åke Staffan Larsson, Gothenburg (SE); Marica Ersson, Gothenburg (SE)

(73) Assignee: Aktiebolaget SKF, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,910

(22) Filed: May 30, 2022

(65) Prior Publication Data

US 2022/0389559 A1    Dec. 8, 2022

(30) Foreign Application Priority Data

Jun. 2, 2021 (DE) .......................... 102021205629.6

(51) Int. Cl.
| | |
|---|---|
| *C23C 8/32* | (2006.01) |
| *B23P 15/00* | (2006.01) |
| *C21D 1/06* | (2006.01) |
| *C21D 1/58* | (2006.01) |
| *C21D 1/607* | (2006.01) |
| *C21D 9/36* | (2006.01) |
| *C21D 9/40* | (2006.01) |
| *C23C 8/80* | (2006.01) |

(52) U.S. Cl.
CPC .............. *C23C 8/32* (2013.01); *B23P 15/003* (2013.01); *C21D 1/06* (2013.01); *C21D 9/36* (2013.01); *C21D 9/40* (2013.01); *C23C 8/80* (2013.01); *C21D 1/58* (2013.01); *C21D 1/607* (2013.01)

(58) Field of Classification Search
CPC . C23C 8/32; C23C 8/80; B23P 15/003; C21D 1/06; C21D 9/36; C21D 9/40; C21D 1/58; C21D 1/607
See application file for complete search history.

(56) References Cited

U.S. PATENT DOCUMENTS

| | | | | |
|---|---|---|---|---|
| 9,828,664 | B2 * | 11/2017 | Larsson | C22C 38/00 |
| 2015/0225835 | A1 * | 8/2015 | Larsson | C21D 1/18 |
| | | | | 148/318 |
| 2021/0254202 | A1 * | 8/2021 | Gong | C23C 8/22 |

FOREIGN PATENT DOCUMENTS

| | | | |
|---|---|---|---|
| EP | 2888379 B1 | 6/2020 | |
| WO | WO-2019223925 A1 * | 11/2019 | C23C 8/02 |

OTHER PUBLICATIONS

Quenching, Encyclopedia Britannica, materials processing, https://www.britannica.com/technology/quenching-materials-processing (Year: 1998).*

* cited by examiner

*Primary Examiner* — Rebecca Janssen
(74) *Attorney, Agent, or Firm* — GARCIA-ZAMOR INTELLECTUAL PROPERTY LAW, LLC; Ruy Garcia-Zamor (57) ABSTRACT

The present invention provides a method of heat treating a steel component including the sequential steps of: (a) carbonitriding the steel component; (b) quenching the steel component; (c) optionally tempering the steel component; and (d) ferritically nitrocarburizing the steel component.

17 Claims, 3 Drawing Sheets

METHOD OF HEAT TREATING A STEEL COMPONENT

CROSS-REFERENCE TO RELATED APPLICATIONS

This application claims priority to German Patent Application no. 102021205629.6, filed Jun. 2, 2021, the contents of which is fully incorporated herein by reference.

TECHNICAL FIELD

The present invention concerns a method of heat treating a steel component, and a steel component that has been subjected to such a method. Examples of suitable steel components include components for bearings or the like, such as a rolling element, roller or ball, and/or an inner or outer ring, for example.

BACKGROUND OF THE INVENTION

Carbonitriding is a metallurgical surface modification technique that is used to increase the surface hardness of a metal component, thereby reducing the wear of the component during use. During the carbonitriding process, atoms of carbon and nitrogen diffuse interstitially into the metal, creating barriers to slip and increasing the hardness near the surface, typically in a layer that is 0.1 to 0.3 mm thick, but 1 to 2 mm can also be achieved. Carbonitriding is usually carried out a temperature of about 850 to about 860° C.

Carbonitriding is normally used to improve the wear resistance of steel components comprising low or medium carbon steel, and rarely high carbon steel. Although steel components comprising high carbon steel are stronger, they have been found to be more susceptible to cracking in certain applications. Components may for example be used in typically dirty environments where lubricating oil is easily contaminated, such as in a gear box, and it is well known that the service life of components can decrease considerably under such conditions. Particles in the lubricant can namely get in between the various moving parts of a gear box, for example, and make indentations in their contact surfaces. Stress is concentrated around the edges of these indentations and the contact stress concentrations may eventually lead to fatigue cracking. Using components damaged in this way may also result in an increase in the noise generated by the components.

Ferritic nitrocarburizing is a surface hardening process in which nitrogen and carbon are supplied to the surface of a ferrous metal. It is usually carried out at a temperature of about 525° C. to about 625° C., and produces a thin, hard case consisting of a ceramic iron-nitrocarbide layer (compound layer) and an underlying diffusion zone where nitrogen and carbon are dissolved in the matrix. Ferritic nitrocarburizing is most commonly used on low-carbon, low-alloy steels. Above the equilibrium temperature of about 570 to about 580° C., the process becomes austenitic nitrocarburizing. However, it may take a long time to reach the equilibrium temperature, so heating to this temperature for a shorter period of time may still result in ferritic nitrocarburizing.

Patent Document 1 (PD1), EP 2 888 379 B1, describes a method of heat treating a steel component that involves, inter alia, the sequential steps of carbonitriding the steel component, followed by ferritically nitrocarburizing the steel component, subsequently quenching the steel component in a salt or oil bath, and then tempering the steel component at a temperature of about 150 about 260° C. to toughen the steel component. However, it has been found that a method in which these steps are performed in this order, as required in PD1, may result in issues with distortion in the final product, i.e. the heat-treated steel component. Accordingly, in order to account for this distortion in the heat-treated steel component, additional machining may be required so that the desired dimensions of said component may be restored. Such additional machining may also include further mechanical polishing, which may reduce the corrosion-resistance properties of the heat-treated steel component. After the final tempering step to, inter alia, minimise the risk of cracks in the heat-treated steel component, any further mechanical surface treatment that makes changes any larger than on the order of single microns, for example, may have a negative effect on the corrosions-resistance properties of the heat-treated steel component. This is because a portion of the case layer may be removed, for example.

Other solutions proposed to tackle corrosion issues of steel components include, for example, the use of a combination of a lubricant and seals, coatings or other steel and heat treatment solutions.

Accordingly, there is a need to provide an improved method of heat treating a steel component wherein distortion of the final heat-treated steel component is minimised, while the final corrosion-resistance properties are maintained as high as possible. In other words, there is a need to provide a method of heat treating a steel component that imparts high corrosion resistance to the heat-treated steel component without distorting the steel component, so that no further machining and/or mechanical treatment, for example, is required in order to restore the desired dimensions of the steel component.

The present invention seeks to tackle at least some of the problems associated with the prior art or at least to provide a commercially acceptable alternative solution thereto.

SUMMARY OF THE INVENTION

In summary, an object of the invention is therefore to provide an improved method of heat treating a steel, for example a method that results in a heat-treated steel component with low distortion, or at least to provide an alternative method of heat treating a steel.

To achieve this object, the present invention provides a method of heat treating a steel component and a heat-treated steel component according to the claims appended hereto.

Specifically, the present invention provides a method of heat treating a steel component comprising the sequential steps of:
  a) carbonitriding the steel component;
  b) quenching the steel component;
  c) optionally tempering the steel component; and
  d) ferritically nitrocarburizing the steel component.

Each aspect or embodiment as defined herein may be combined with any other aspect(s) or embodiment(s) unless clearly indicated to the contrary. In particular, any features indicated as being preferred or advantageous may be combined with any other feature indicated as being preferred or advantageous.

The term "sequential steps" as used herein means that the steps listed thereafter are performed in the order in which they are listed. In other words, in the present invention the steps (a)-(d) are performed in the order (a), (b), (c), then (d). The term "sequential steps" as used herein encompasses the option of including further steps before, after, or in between any of the listed steps. However, the term "sequential steps" as used herein also encompasses the option that each step directly follows the previously-listed step, i.e. with no intervening steps. For example, preferably, step (b) directly follows step (a), i.e. there is preferably no intervening step between step (a) and step (b), and step (c) preferably directly follows step (b), i.e. there is preferably no intervening step between step (b) and step (c). In one preferred embodiment, for example, the method comprises no further steps between any one of the listed steps (a)-(d). The method of the present invention comprises the sequential steps (a), (b), (c) and (d). However, in some preferred embodiments, the method of the present invention consists of the method steps (a), (b), (c), and (d), optionally followed by a cooling step as described herein. Other possible intervening steps are described below.

The method of heat treating a steel component comprises (a) carbonitriding the steel component, preferably as the first step in the method. The term "carbonitriding" (CN) as used herein takes its usual meaning in the art, for example as described in the background of the invention section. Preferably, carbonitriding the steel component in step (a) comprises carbonitriding the steel component for 5 to 30 hours, such as for 10 to 25 hours, preferably for 15 to 23 hours, more preferably for 17 to 21 hours.

Any known carbonitriding process may be used in the present invention. However, preferably, the carbonitriding is carried out at a temperature towards the upper end of the usual range. For example, carbonitriding the steel component in step (a) is preferably performed at a temperature of from about 850 to about 1040° C., more preferably at a temperature of from about 890 to about 980° C., still more preferably at a temperature of from about 930 to about 970° C., such as about 970° C. Carbonitriding the steel component in step (a) may be carried out in a low pressure furnace, for example.

The process environment may be provided by the introduction of methane, propane and/or natural gas (for carbon) and ammonia (for nitrogen) into a furnace in the presence of a controlled carrier gas. Suitable methods of introducing these gases are known to the skilled person. By maintaining the proper ratios of the working gases, the component is provided with a thin carbonitrided layer of carbon- and nitrogen-rich steel. According to an embodiment of the invention the method includes supplying a higher concentration of ammonia at the beginning of the carbonitriding step (a) to boost the carbonitriding process. For example, 9.5% ammonia may be used initially; this may be lowered to 6.5% ammonia and then 0%. 9.5% ammonia may be used for about 70% of the carbonitriding step (a). Alternatively, the method may include running the CN process in step (a) with a constant ammonia flow/percentage concentration, for example at from 3 to 15% ammonia, for example about 9.5% ammonia or about 6.5% ammonia. Preferably a higher ammonia flow/percentage concentration is used for higher temperatures and a lower flow/percentage concentration is used for lower temperatures, for example about 15% for 970° C. or about 3% for temperatures below 860° C. Such percentages are in vol. % unless otherwise stated. The load bearing/carrying capacity of the steel component is increased by the carbonitriding step (a). The load bearing capacity depends on the case depth reached by carbonitriding, for example.

The method of heat treating a steel component comprises (b) quenching the steel component after step (a), preferably directly after step (a), i.e. preferably with no intervening steps. The term "quenching" as used herein takes its usual meaning in the art, for example rapid cooling in a medium to obtain certain material properties and prevent undesired low-temperature processes, such as phase transformations, for example, from occurring. Preferably, quenching the steel component comprises transforming the microstructure of the steel component to a martensite or bainite (upper or lower) microstructure. The skilled person is aware of suitable temperature ranges for transforming to martensite or bainite (upper or lower) microstructures, respectively. For example, the microstructure of the steel component transforms to bainite at a temperature of about 220 to about 260° C., such as about 240° C. Preferably, the quenching is in a salt or oil bath. Suitable methods of quenching are known to the skilled person. Quenching after the carbonitriding step (a) is necessary in order to obtain a steel component with a martensite and/or bainite microstructure so that the steel component will have a desirable hardness. The temperatures used in the quenching step (b) may be selected by the skilled person to achieve optimum properties with acceptable levels of dimensional changes. For example, oil/salt bath quenching may be used to minimise distortion of intricate parts. Such oil/salt bath quenching may be carried out at temperatures such as, for example about 180 to about 320° C. for salt bath quenching, about 90 to about 160° C. for warm oil quenching and about 180 to about 230° C. for hot oil quenching. Salt bath quenching or warm oil quenching are generally preferred.

The method of heat treating a steel component comprises (c) optionally tempering the steel component after step (b), preferably directly after step (b), i.e. preferably with no intervening steps. The term "tempering" as used herein takes its usual meaning in the art, for example a method of reheating and cooling the steel component in order to improve the properties thereof, such as hardness. Step (c) is generally required if a martensite microstructure is desired, although such a method may still not comprise step (c) if a martensite microstructure is desired. However, step (c) is generally not required if a bainite (upper or lower) microstructure is desired, although such a method may still comprise step (c) if a bainite (upper or lower) microstructure is desired. However, in the present invention, the method preferably comprises step (c). Step (c) preferably comprises tempering the steel component at a temperature of about 150 to about 620° C., for example from about 200 to about 550° C. or from about 300 to about 400° C. In some embodiments, step (c) comprises tempering the steel component at a temperature of about 150 to about 300° C. However, preferably, in the method of the present invention if it is desired to optimally minimise distortion and dimension changes in the steel component, then the temperature of the tempering step (c) is at the higher end of the temperature range, for example in this case step (c) preferably comprises tempering the steel component at a temperature of about 300 to about 620° C., such as from about 400 to about 620° C. or even from about 500 to about 620° C. However, in order to minimise costs and logistics, for example, the temperature of the tempering step (c) may be at the lower end of the temperature range, such as from about 150 to about 250° C. This lower temperature is a typical tempering temperature for steel having a martensitic microstructure, for example. The temperature of the tempering step (c) may be tailored depending on the desired properties and microstructure of the steel component. After the tempering step (c), the steel component may then be cooled to room temperature. Preferably, the steel component is cooled to room temperature after the tempering step (c). This is so that, inter alia, the steel component may be hard machined after step (c) and before step (d). Such hard machining may include one or more of grinding, polishing and/or hard turning or the like and is described further below. Preferably, the tempering step (c) is carried out for a duration of from 1 to 5 hours, preferably about 2 hours.

The quenching and optional tempering steps are necessary after the carbonitriding step, preferably directly after the carbonitriding step, in order to obtain the desired high hardness and load carrying properties of the resulting heat-treated steel component (for example to achieve the desired martensite and/or bainite microstructures). The tempering step may also help to minimise cracks in the steel component, thereby helping to increase wear resistance and component lifetime, for example. In addition, scrap wastage may be minimised. The tempering step may also help to obtain dimensional stability in the steel component. Typically, step (c) is performed within 4 hours of step (b), for martensite in particular. Higher temperatures in the tempering step have also surprisingly been found to result in less distortion and/or dimension changes from performing the FN step that follows.

The method of heat treating a steel component comprises (d) ferritically nitrocarburizing the steel component after step (c), preferably directly after step (c), i.e. preferably with no intervening steps. However, other method steps may be performed between steps (c) and (d), if desired. The term "ferritically nitrocarburizing" (FN) as used herein takes its usual meaning in the art, for example as described in the background of the invention section. The FN step (d) may be carried out using gaseous, salt bath, ion or plasma or fluidised bed ferritic nitrocarburizing. Preferably, step (d) comprises ferritically nitrocarburizing the steel component at a temperature of about 580° C. or less, for example at a temperature of from about 500 to about 580° C. Above these temperatures, then the process step may result in austenitic nitrocarburizing, which is not the purpose of the method described herein. The atmosphere in the FN step (d) is preferably an atmosphere consisting of from 50 to 70 vol. % $NH_3$, 1 to 10 vol. % $CO_2$ and the balance one or more inert gases. For example, the FN step (d) is preferably carried out in an atmosphere of about 60 vol. % $NH_3$, about 35 vol. % $N_2$ and about 5 vol. % $CO_2$. Preferably, the FN step (d) is carried out for a duration of from 3 to 8 hours. However, the required duration of the FN step (d) may be dependent on the temperature. For example, a lower temperature may require a longer duration and vice versa.

The FN step (d) may provide the steel component with a tough tempered core and a hard ceramic-like surface and a diffusion zone. The FN may help to achieve so-called "stainless steel properties". The preferred low process temperature of the FN step induces little shape distortion in the steel component, which may mean that post-processing, such as grinding or machining, is not necessary. This step therefore helps contribute to the cost-effective way of increasing the wear and corrosion resistance of a steel component.

As described above, the FN step (d) may be performed as is standard in the art, and preferably at a temperature of 590° C. or less. However, optionally, the FN step (d) may further comprise a post-oxidation process. Such an oxidation process may result in fewer pores in the outer most layer of the heat-treated steel component, thereby providing a compound layer which may further reduce the risk of wear and micro-flaking within the first few microns from the surface of the heat-treated steel component. In other words, while such an additional process is not essential to the invention, such a process may help further increase the corrosion and/or wear resistance of the heat-treated steel component. In general, suitable post-oxidation techniques are known to those skilled in the art. For example, a suitable FN step (d) including post-oxidation may be Bodycote's Corr-i-Dur (registered trademark) process. Typical post-oxidation conditions include a temperature of 450 to 550° C. and the presence of oxidation media such as evaporated water or $N_2O$ gas, for example. Preferably, the obtained oxide layer is from 0.5 to 2.0 μm thick, measured by electron microscopy, for example.

The method of heat treating a steel component preferably comprises a further step of cooling the steel component after step (d). In other words, the further cooling step involves cooling the steel component from the temperature of the FN step (d) to a lower temperature, such as to room temperature (e.g. about 20° C.). The cooling step may involve, for example, either furnace cooling (e.1) the steel component or further quenching (e.2) the steel component and then subsequently tempering of the steel component. The further quenching and tempering steps may be performed under the quenching and tempering conditions as described above, but preferably such additional tempering is performed at a temperature of about 150 to about 450° C., such as about 250 to about 400° C., in order to release stress and minimise any retained austenite in the steel component.

However, preferably, the cooling step comprises furnace cooling (e.1) the steel component (directly) after step (d). The term "furnace cooling" as used herein means slowly cooling the steel component by leaving the steel component in the furnace used for the FN step until the furnace and/or steel component have cooled to a low temperature, such as room temperature (e.g. about 20° C.), for example. In other words, the "furnace cooling" is a passive, slow cooling process, in contrast to rapid quenching. For example, the furnace cooling may be performed by turning off the heat in the furnace and letting the furnace and steel component cool passively to room temperature, preferably in an inert, e.g. $N_2$, environment, for example. The door of the furnace may then be opened once the furnace temperature reaches approximately 130° C., for example, to reduce the likelihood of oxides forming on the surface of the steel component in air. Typically, such cooling is characterised by a slow cooling time from the temperature of the FN step to the low temperature, such as room temperature. For example, cooling from about 580° C. to about 130° C. is thought to take from 2 to 4 hours. Advantageously, such slow furnace cooling, which is preferably the last heat treatment step in the method, helps to decrease the risk of distortion of the heat-treated steel components, thereby decreasing the risk that further mechanical processing, such as machining and/or grinding, of the heat-treated steel component may be required. Such post-heat-treatment mechanical processing steps may reduce the wear and/or corrosion resistance properties imparted by the method of heat treatment on the steel component, by, for example, removing part of the compound layer on the surface of the steel component.

The inventive concept of the present invention primarily stems from the surprising results achieved by the specific order of the heat treatment steps (a)-(d), preferably with a slow final cooling step after step (d). In particular, the inventors have surprisingly found that performing quenching and optional tempering of the steel component (preferably directly) after the CN step (a) but, importantly, before the FN step (d), in a method comprising all of the steps (a)-(d), a heat-treated steel component may be provided that has improved wear resistance, corrosion resistance, load bearing capacity, surface hardness, core hardness, compound layer thickness, abrasive wear resistance, adhesive wear resistance and/or fatigue resistance and enhances its ability to relax stress concentration at the edges of any indentations in its surface, while also importantly reducing the likelihood that post-heat-treatment mechanical processing, such as mechanical surface treatment, is necessary to restore the desired dimensions of the steel component. This is because the likelihood of distortion of the steel component throughout the method of heat treatment may be reduced. This is particularly important because the need for post-heat-treatment mechanical processing, such as mechanical surface treatment, in order to restore the desired dimensions of the steel component for the intended use, may reduce the wear and/or corrosion resistance, for example, imparted by the method of heat treating the steel component.

In other words, without wishing to be bound by theory, it is thought that due to the quenching and optional tempering steps after the CN step but before the FN step, a steel component with desirable hardness can be achieved, then following these steps with a, preferably low-temperature and slow-cooled, FN step, a final heat-treated steel component may be obtained with a lower likelihood of distortion, therefore reducing and/or eliminating the need for further mechanical post-processing, e.g. grinding and/or polishing. By avoiding these further mechanical steps, corrosion properties of the final steel component may be maintained as high as possible. Moreover, avoiding any further mechanical steps advantageously helps to minimise production costs. This is in contrast to the order of steps in PD1, for example, in which the FN step occurs between the CN step and the quenching and tempering steps.

The surface of a steel component subjected to such a method may be provided with a surface hardness of 800-1000 HV, and a core hardness of 280-660HV depending on the type of steel used. Compared with the prior art, the hardness of both the surface and the core of a high carbon steel component subjected to such a method is greater than that of known components comprising steel having a low carbon content. The wear resistance and fatigue strength for rolling contact are improved as a result. Furthermore, the loading capacity of a steel component, such as a bearing, will be increased, whereby the bearing may be of smaller construction for a particular application. The fatigue resistance on rolling contact also increases, so that the service life of the steel component can be extended. Additionally, the disadvantage that through cracking occurs, described in the prior art, is not found. The steel component may be provided with a compound layer having a thickness of 5 to 20 μm measured from the surface of the steel component, for example. This may all be achieved in the method of the present invention, while the likelihood of distortion of the heat-treated steel component is reduced.

As described above, this surprising result is also reinforced and further optimally achieved (i.e. achieving the least distortion and dimensional changes) when the temperature of the tempering step is towards the higher end of the described range, i.e. up to about 620° C., the temperature of the FN step (d) is low, as described above, and/or when the cooling of the heat-treated steel component after the FN step (d) is slow. However, as described above a low tempering temperature, such as about 160° C., may be used in order to minimise logistics and costs.

Such heat-treated steel components are particularly useful for applications wherein the steel component is subjected to alternating Hertzian stresses, particularly wherein precise dimensions of the steel component are required for optimal performance, for example steel components that are required to be a particular size and/or shape in order to perform their desired purpose. Such applications include components for bearings, such as rollers, rolling elements, bearing rings and/or raceways for bearings.

Therefore, preferably, the method of heat treating a steel component of the present invention comprises no further heat treatment steps (e.g. carburizing, carbonitriding, ferritically nitrocarburizing, quenching, tempering and/or annealing), i.e. no further heat treatment steps other than those in steps (a)-(d), (a)-(e.1), or (a)-(e.2). However, the method of heat treating a steel component may comprise other mechanical steps, for example, although preferably not after step (d), (e.1) or (e.2).

For example, the method may further comprise a step (x) of machining the steel component between steps (c) and (d). The step of machining may involve, for example, mechanically working the steel component to the desired shape and/or to return the steel component to the desired dimensions, e.g. by one or more of grinding, polishing and/or hard-turning or the like. Hard turning may optionally be followed by lapping, i.e. the very shallow removal of a few μm, for example. The method typically comprises step (x). Step (x) preferably comprises hard machining of the steel component, e.g. to remove grinding allowance from the heat treatment. The mechanical machining may also improve the surface roughness, i.e. to lower the surface roughness of the steel component. Step (x) may also help to remove some non-perfect material from the earlier CN treatment. Because the method of the present invention preferably comprises no further machining steps after step (d), the final surface roughness and finish may be defined by the machining step (x) between steps (c) and (d). Hard machining is generally preferred over soft machining because soft machining may typically undesirably result in quite rough surfaces.

The method may also optionally comprise a further step (y) of tumbling the steel component after step (d), step (e.1) or step (e.2), for example. The term "tumbling" or "tumble finishing" as used herein takes on its usual meaning in the art, i.e. the known process for smoothing and polishing the surface of the steel component. Step (y) may help to increase the robustness of the micro-cracks in the steel component during applications that require very high loading, for example.

Preferably, the steel component has a carbon content of 0.10 to 1.20 wt. %, such as 0.10 to 0.50 wt. % or 0.60 to 1.20 wt. %, preferably 0.60 to 1.20 wt. %, based on the total weight of the steel component, i.e. a steel with a medium to high carbon content, or any other steel in accordance with ISO 683-17:2014. For example, preferably the steel component comprises or is made of a bearing steel. Suitable bearing steels are known to the skilled person. According to an embodiment of the invention the steel component comprises a high carbon bearing steel such as SAE 52100/100Cr6 or ASTM-A485 grade 2. Preferably, the steel component comprises a 100Cr6 steel or a 100CrMo7-3 steel, or any other steel in accordance with ISO 683-17:2014. Other possible steels for use in the present invention include, for example, 100CrMo7, 100CrMnMoSi8-4-6 to increase core hardness for example, and 100CrMo7-4. Case carburising steels may also be used. Any one of the above-mentioned steels may be used as required in order to increase tempering stability and thereby help achieve greater load-carrying ability.

Suitable non-limiting steel grades for use in the method of the present invention includes those outlined in Tables 1 and 2, for example. Other suitable steel grades may be used, such as those outlined above. Values are given in wt. %, based on the total weight of the steel.

TABLE 1

| Standard | Grade | C | Mn | P | S | Si | Ni | Cr | Cu | Mo |
|---|---|---|---|---|---|---|---|---|---|---|
| ASTM A295 | 52100 | 0.93-1.05 | 0.25-0.45 | 0.025 | 0.015 | 0.15-0.35 | 0.25 | 1.35-1.60 | 0.30 | 0.10 |
| DIN 17230 | 100Cr6/1.3505 | 0.90-1.05 | 0.25-0.45 | 0.030 | 0.025 | 0.15-0.35 | 0.30 | 1.35-1.65 | 0.30 | — |
| JIS G4805 | SUJ2 | 0.95-1.10 | 0.50 | 0.025 | 0.025 | 0.15-0.35 | — | 1.30-1.60 | — | — |
| BS 970 | 535A99/EN31 | 0.95-1.10 | 0.40-0.70 | — | — | 0.10-0.35 | — | 1.20-1.60 | — | — |

TABLE 2

| 100CrMo7 | C | Si | Mn | P | S | Cr | Ni | Mo |
|---|---|---|---|---|---|---|---|---|
| Min | 0.93 | 0.25 | 0.60 | — | 0.005 | 1.65 | — | 0.40 |
| Max | 0.98 | 0.35 | 0.80 | 0.025 | 0.015 | 1.95 | 0.25 | 0.50 |

In some embodiments, the steel component comprises or constitutes a rolling element or roller, or a steel component for an application in which the steel component is subjected to alternating Hertzian stresses, such as rolling contact or combined rolling and sliding, such as a slewing bearing or a raceway for a bearing. The component may include or constitute gear teeth, a cam, shaft, bearing, fastener, pin, automotive clutch plate, tool, or a die. The steel component may for example constitute at least part of a roller bearing, a needle bearing, a tapered roller bearing, a spherical roller bearing, a toroidal roller bearing or a thrust bearing. The component may be used in food & beverage, automotive, wind, marine, metal producing or other machine applications which require high wear resistance and/or high corrosion resistance and/or increased fatigue and/or tensile strength. The steel component may be used in any application in which it is likely to be subjected to high temperature (e.g. about 200 to about 350° C.), stress, strain, impact and/or wear under a normal operational cycle, such as in under contaminated and/or poor lubricant conditions.

In another aspect, the present invention provides a heat-treated steel component treated by the method of heat treating a steel component described herein. Such a heat-treated steel component has the desirable properties described above, and post-heat-treatment mechanical processing may not be required to restore the desired dimensions of the component.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The invention will now be described in relation to the following non-limiting drawings in which.

It should be noted that the drawings have not been drawn to scale and that the dimensions of certain features have been exaggerated for the sake of clarity.

DETAILED DESCRIPTION OF THE EMBODIMENTS

Figure 1:
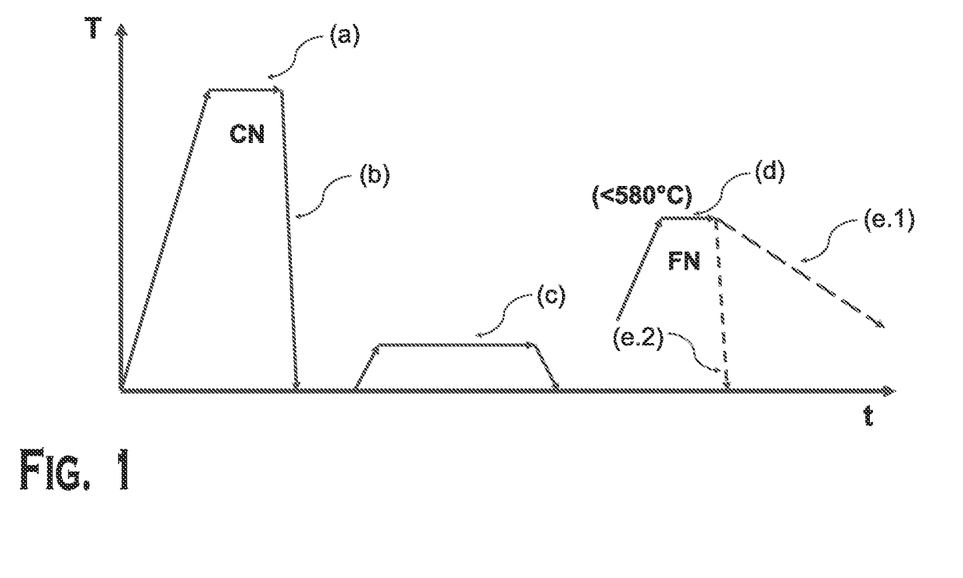
FIG. 1 shows a method according to an embodiment of the invention.

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. FIG. 1 shows a heat treatment cycle according to an embodiment of the present invention, on a plot of temperature (T) vs. time (t). Temperature (T) being on the y-axis and time (t) being on the x-axis. The method comprises subjecting a steel component to a CN process as described herein (step (a)), followed by a quenching process as described herein (step (b)), followed by an optional tempering process as described herein (step (c)), followed by a FN process as described herein (step (d)), optionally followed by a cooling step (step (e.1) or (e.2), preferably (e.1)).

Figure 2:
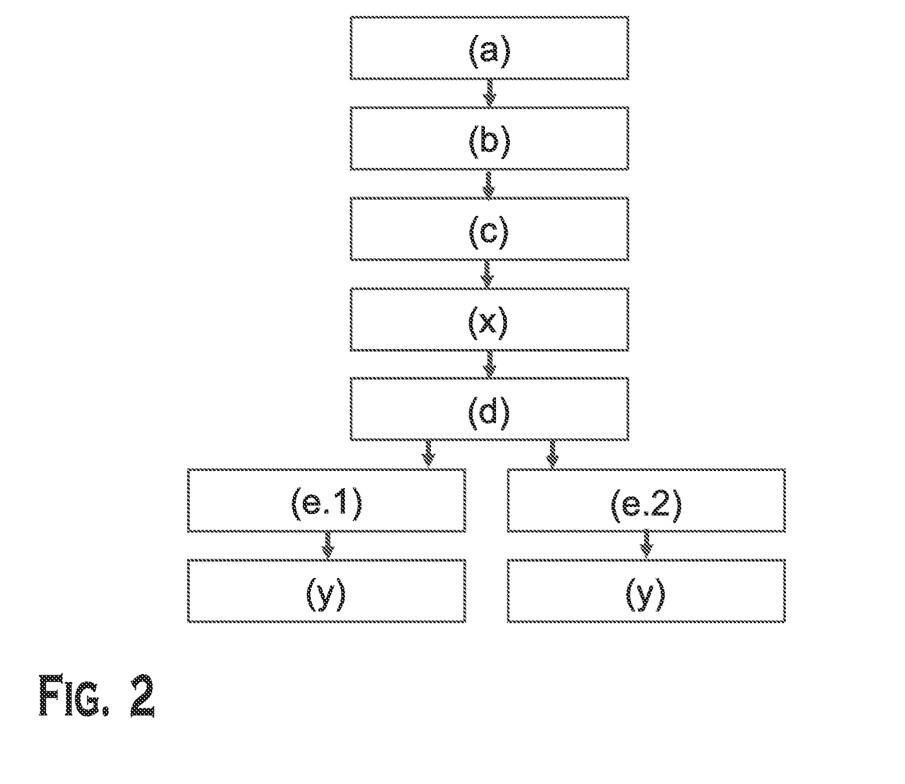
FIG. 2 shows a method according to an embodiment of the invention.

FIG. 2 shows a flow chart of a heat treatment cycle according to an embodiment of the present invention. The method comprises subjecting a steel component to a CN process as described herein (step (a)), followed by a quenching process as described herein (step (b)), followed by an optional tempering process as described herein (step (c)), optionally followed by a machining process (step (x)), then followed by a FN process as described herein (step (d)), optionally followed by a cooling step (step (e.1) or (e.2), preferably (e.1)) which is then optionally further followed by a further tumbling process (step (y)).

Figure 3:
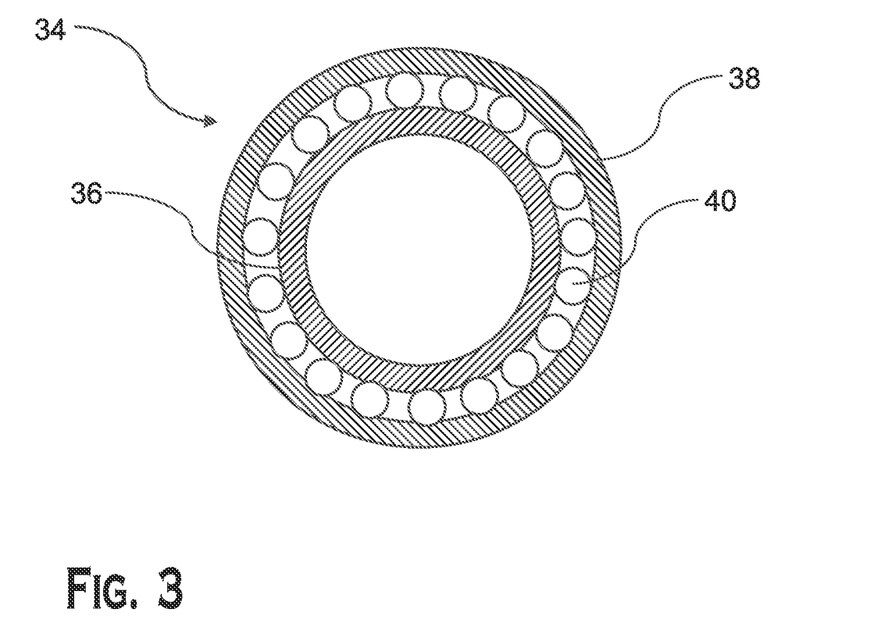
FIG. 3 shows a steel component according to an embodiment of the invention.

FIG. 3 shows an example of a steel component according to an embodiment of the invention, namely a rolling element bearing 34 that may range in size from 10 mm diameter to a few metres in diameter and have a load-carrying capacity from a few tens of grams to many thousands of tonnes. The bearing 34 according to the present invention may namely be of any size and have any load-carrying capacity. The bearing 34 has an inner ring 36 and an outer ring 38 and a set of rolling elements 40. The inner ring 36, the outer ring 38 and/or the rolling elements 40 of the rolling element bearing 34, and preferably at least part of the surface of all of the rolling contact parts of the rolling element bearing 40 may be subjected to a method according to the present invention.

The invention will now be described in relation to the following non-limiting examples.

Figure 4:
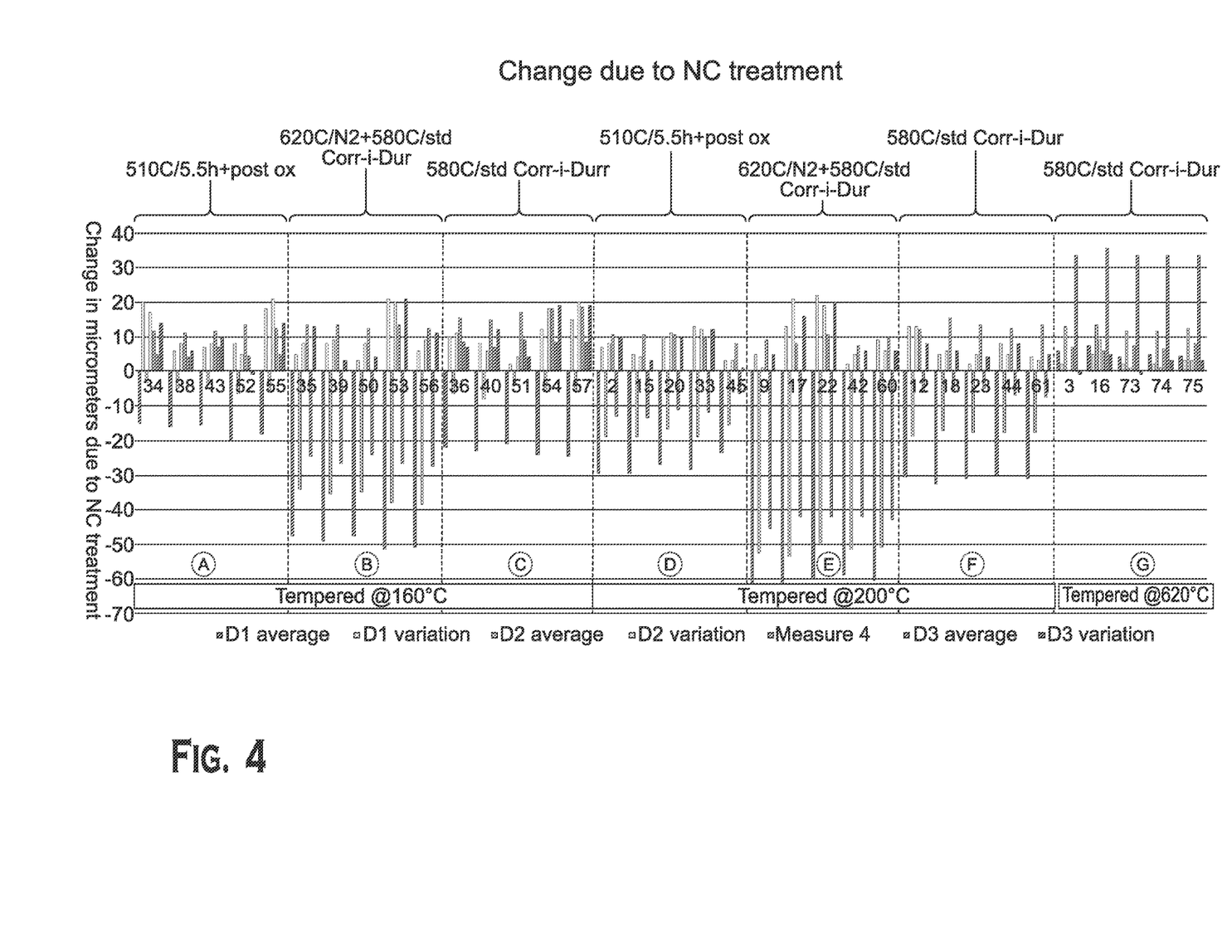
FIG. 4 is a plot showing the change (in micrometres) of different parts of a steel component due to nitrocarburizing treatment.

FIG. 4 is a plot showing the change (in micrometres) of different parts of a steel component due to nitrocarburizing treatment, i.e. the amount of distortion of the steel component due to the heat treatment. The steel components were rings for bearings. The steel grade used for the steel components was ISO 683-17 steel designation 100CrMo7-3. Tests A, B and C involved a tempering step (c) being performed at a temperature of 160° C. Tests D, E and F involved a tempering step (c) being performed at a temperature of 200° C. Test G involved a tempering step (c) being performed at a temperature of 620° C. Tests A and D involved an FN step (d) being performed at 510° C. for 5.5 hours including an additional post-oxidation treatment. Tests B and E involved an FN step (d) being performed at 620° C. in $N_2$ followed by a temperature of 580° C. and a standard Corr-i-Dur (registered trademark) process. Tests C, F and G involved an FN step (d) being performed at 580° C. including an additional standard Corr-i-Dur (registered trademark) process.

The plot shows the change in different measurements of different steel components after the nitrocarburizing process is performed. Measurements D1 and D2 are bore diameters, D3 is the shoulder diameter, and Measure 4 is the difference between the average of D2 and the average of D1 (i.e. (average D2)—(average D1)). The ring has a conical bore and therefore Measure 4 is the inclination of the bore. The numbers on the plot indicate each component tested.

Advantageously, the amount of distortion due to the nitrocarburizing processes is within tolerance. However, Tests A, C, D and F show even less distortion than Tests B and E, which involve a higher nitrocarburizing temperature of 620° C. Moreover, Test G, which involves a tempering step (c) at 620° C., shows very little distortion in the bore diameters, although larger shoulder diameter distortion.

The foregoing detailed description has been provided by way of explanation and illustration, and is not intended to limit the scope of the appended claims. Many variations in the presently preferred embodiments illustrated herein will be apparent to one of ordinary skill in the art and remain within the scope of the appended claims and their equivalents.

The invention claimed is:

1. A method of heat treating a steel component comprising the sequential steps of:
 carbonitriding the steel component with a constant ammonia flow/percentage concentration of 15% at a temperature below 970° C.;
 after the step of carbonitriding and before ferritically nitrocarburizing, quenching the steel component in an oil bath;
 after the step of quenching, ferritically nitrocarburizing the steel component.

2. The method of claim 1, wherein the step of carbonitriding the steel component comprises carbonitriding the steel component for 5 to 30 hours.

3. The method of claim 1, further comprising: after the step of carbonitriding and after the step of quenching, tempering the steel component.

4. The method of claim 1, further comprising a step of tempering the steel component comprises tempering the steel component at a temperature of about 150 to about 620° C.

5. The method of claim 1, wherein ferritically nitrocarburizing the steel component comprises ferritically nitrocarburizing the steel component at a temperature of about 580° C. or less.

6. The method of claim 1, wherein the method further comprises either:
 a step of furnace cooling the steel component after the step of ferritically nitrocarburizing; or
 a step of further quenching the steel component after the step of ferritically nitrocarburizing and then subsequently tempering the steel component.

7. The method of claim 6, wherein the method further comprises a step of machining the steel component before the step of ferritically nitrocarburizing and tumbling the steel component after any one of the steps of the group of: ferritically nitrocarburizing, or furnace cooling.

8. The method of claim 1, wherein the steel component has a carbon content of 0.10 to 1.20 wt. %, based on the total weight of the steel component.

9. The method of claim 1, wherein the steel component comprises or constitutes a rolling element or roller, or a steel component for an application in which the steel component is subjected to alternating Hertzian stresses.

10. A heat-treated steel component treated by the method of heat treating a steel component having the sequential steps of:
 heating the steel component from an initial room temperature of approximately twenty degrees Celsius to a carbonitriding temperature;
 carbonitriding the steel component while the steel component is at the carbonitriding temperature, wherein the carbonitriding of the steel component is accomplished with a constant ammonia flow/percentage concentration of fifteen percent (15%);
 after the step of carbonitriding and before the step ferritically nitrocarburizing, quenching the steel component for a predetermined duration sufficient to return the steel component to the initial room temperature;
 after the steps of carbonitriding and quenching, ferritically nitrocarburizing the steel component, wherein the heat-treated steel component comprises or constitutes a rolling element or roller, or an inner or outer ring of a bearing.

11. The steel component of claim 10, wherein the step of quenching the steel component comprises quenching the steel component in a salt or oil bath.

12. The steel component of claim 10, further comprising a step of tempering the steel component at a temperature of about 150 to about 620° C.

13. The method of claim 2, wherein ferritically nitrocarburizing the steel component comprises ferritically nitrocarburizing the steel component at a temperature of about 580° C. or less.

14. The method of claim 1, wherein the method further comprises machining the steel component before the step of ferritically nitrocarburizing and tumbling the steel component after any one of the steps of the group of: ferritically nitrocarburizing, or furnace cooling.

15. The method of claim 1, wherein the method further comprises tumbling the steel component after any one of the steps of the group of: ferritically nitrocarburizing, furnace cooling, or ferritically nitrocarburizing.

16. The steel component of claim 10, wherein the steel component has a carbon content of 0.10 to 1.20 wt. %, based on the total weight of the steel component.

17. The method of claim 8, wherein the steel component comprises a 100Cr6 steel or a 100CrMo7-3 steel.

* * * * *